United States Patent [19]

Elder

[11] 4,000,400

[45] Dec. 28, 1976

[54] BIDIRECTIONAL MONITORING AND CONTROL SYSTEM

[76] Inventor: Clarence L. Elder, 2400 Greenmount Ave., Baltimore, Md. 21218

[22] Filed: Apr. 9, 1975

[21] Appl. No.: 566,205

[52] U.S. Cl. .................... 235/92 CT; 235/92 EV; 235/92 R; 235/92 L

[51] Int. Cl.² ........................................ H03K 21/06

[58] Field of Search ..... 235/92 TC, 92 CT, 92 MS, 235/92 R, 92 EV, 92 L

[56] References Cited

UNITED STATES PATENTS

| | | | |
|---|---|---|---|
| 3,115,622 | 12/1963 | Jaffe | 235/92 MS |
| 3,346,866 | 10/1967 | Bechtel | 235/92 MS |
| 3,638,186 | 1/1972 | Schwefel | 235/92 V |
| 3,727,034 | 4/1973 | Pope | 235/92 TC |
| 3,793,508 | 2/1974 | Maggi | 235/92 V |

Primary Examiner—Gareth D. Shaw
Assistant Examiner—John P. Vandenburg
Attorney, Agent, or Firm—J. Wesley Everett

[57] ABSTRACT

The number of persons or objects entering and leaving a space such as a room are accurately counted in response to a bidirectional detector unit through which a person or object must completely pass to register a count, and means are provided to disregard any change in the detector unit unless the person or object goes completely past the bidirectional detector, said counting means being connected to a structure whereby when the space is indicated to be completely unoccupied the illumination of the space and/or the temperature modification of the space will be automatically extinguished or modified to more economical levels.

12 Claims, 4 Drawing Figures

BIDIRECTIONAL MONITORING AND CONTROL SYSTEM

The present invention relates to controlling the environment for comfort and for economy and also to register an accurate count of persons entering and leaving a space such as a room or building with means to control the illumination and temperature modification of the building to reduce costs by reducing the illumination and modifying the temperature, either heating or cooling, to more economical levels when the space is unoccupied.

Heretofore, conventional thermostats and light sensing devices and clocks have been used to control the temperature and illumination of space such as a room or building but such prior devices required much manual operation and therefore the optimum conditions for maximum economy were not obtained. Consequently the prior art devices did not obtain the desired maximum efficiency and it is the object of this invention to obtain maximum efficiency in heating, cooling, and lighting.

BRIEF DESCRIPTION OF THE DRAWINGS

In FIG. 4 there is shown the light emitting diodes and light sensitive transitors in the entrance to a room or space, which devices are connected to various electronic components and ultimately to counters which keep track of the number of occupants in the room with means to control the illumination and temperature through a time delay circuit thereby minimizing costs when the room is empty while giving ample time for a person to leave while the room is still illuminated and air conditioned.

In FIG. 3 the elements of the block diagram are described as follows:

Figures 1, 2:
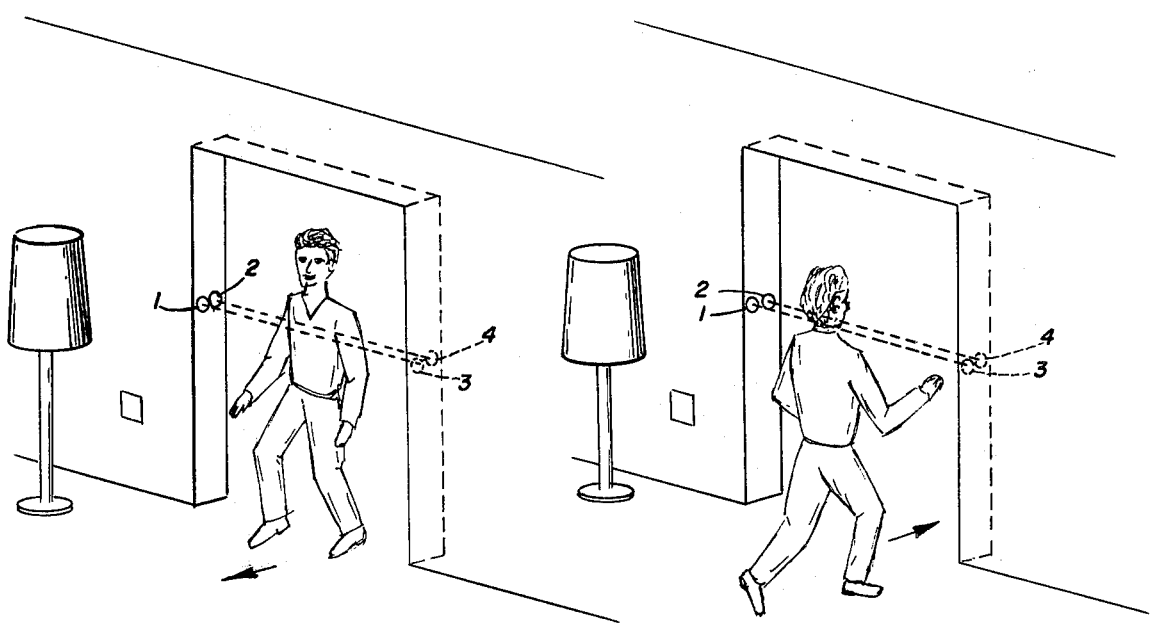
FIG. 1 is an illustration of a person entering the space or room being monitored for occupancy and FIG. 2 is an illustration of a person leaving the monitored room through the same entrance showing how the sensing sets are arranged.
Figure 3:
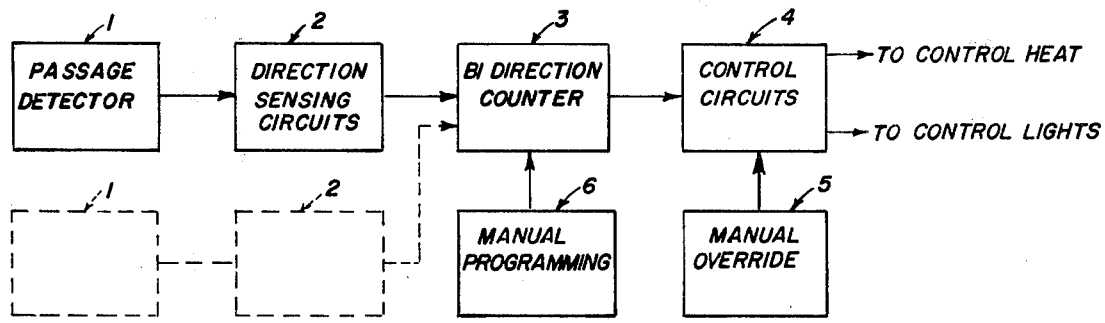
FIG. 3 of the drawings is a block diagram showing the general arrangement and functions of the various components and illustrating that additional entrances may be monitored with the invention.
Figure 4:
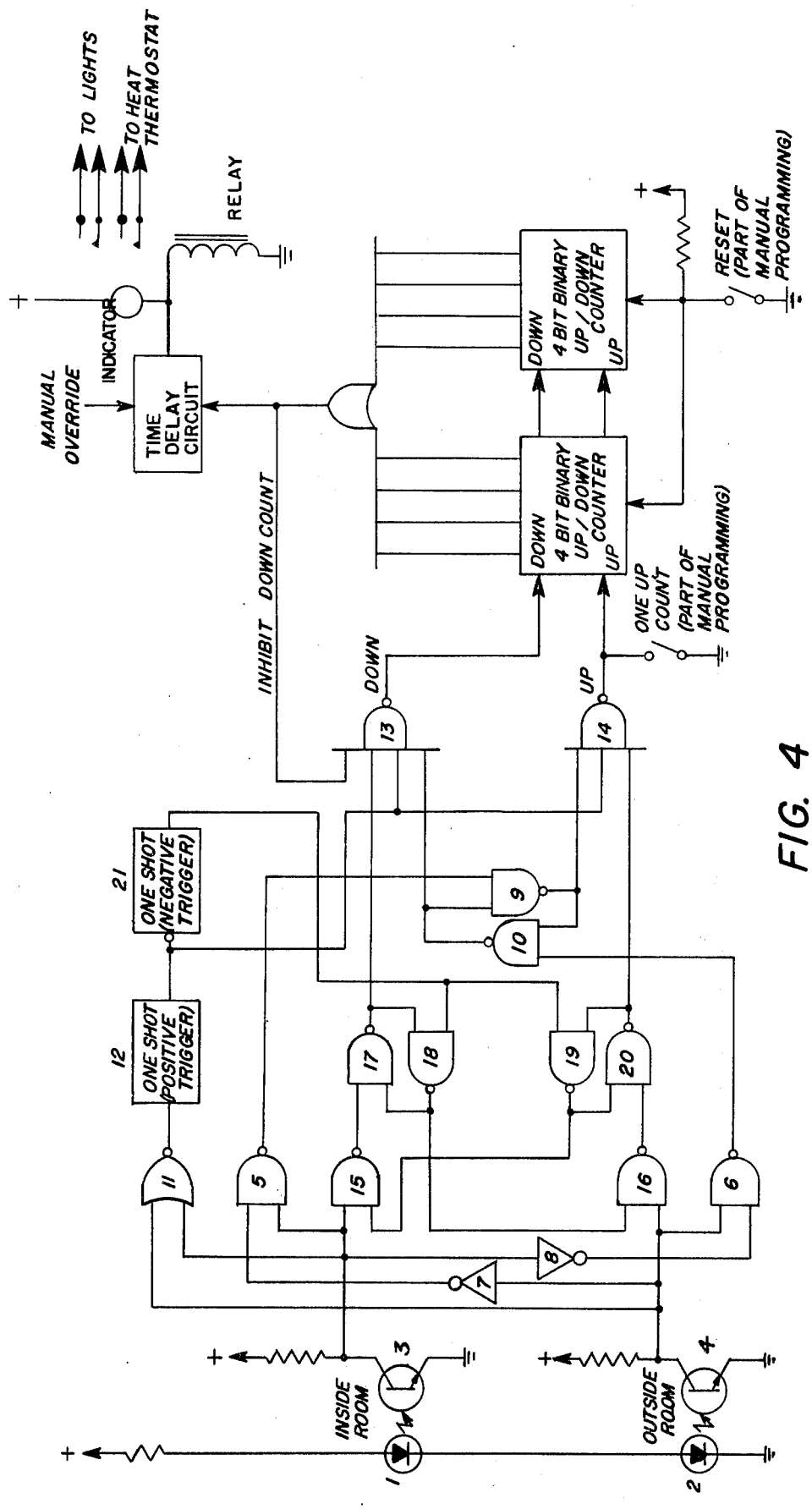
FIG. 4 is a wiring diagram showing the electronic control circuit of the invention, including the occupancy recording counters.

1. Passage Detector—an array of emitters and detectors arranged to detect travel of persons through a room entrance of exit.
2. Direction sensing circuits—determine the direction of travel of each person through a room entrance i.e.: in or out.
3. Bidirectional Counter—adds and subtracts the number of persons entering or leaving the room and thereby indicates absence, presence and/or the number of persons in a room.
4. Control Circuits—amplify bidirectional counter output and isolate power line devices such as lighting from the low voltage circuits. Provides time delays when necessary.
5. Manual Override—controls to permit operation of air conditioning or lights without presence of persons in the room.
6. Manual Programming—allows synchronization of count to correspond with actual occupancy.

The elements of the other figures are identified as follows:
1,2—Light-emitting diodes (L.E.D's)
3,4—Photo transistors
5,6,9,10,13,14,16,17,18,19—NAND gates
11—NOR Gate
7,8—Inverters
12—One-Shot (Positive Triggered Monostable Multivibrator)
21—One-Shot (Negative Triggered Monostable Multivibrator)

To more specifically describe the operation the light beams from 2 L.E.D. emitters impinge on 2 phototransistors causing them to saturate thus clamping their collectors "low". When the beams are interrupted, the collectors go to a "high" condition. The emitter—sensor sets are arranged so that one set is closer to the inside of the room than the other set. Therefore, if a person enters the room, the beam from the set designated "outside" will be interrupted first causing sensor 4 to go "high". This causes NAND gate 6 output to go "low" and cause the set-reset flip-flop comprised of NAND gates 9 and 10 to output a "low" on gate 9 and a "high" on gate 10. The output of sensor 4 is also inverted by inverter 7 to inhibit NAND gate 5 output from going "low" which would cause the flip-flop to oscillate. As the person moves throught the beams, sensor 3 will also go "high" but NAND gate 5 does nothing until sensor 4 returns to "low" at which time gate 5 is steered "low" and gate 6 is forced "high" by inverter 8, causing the flip-flop to output a "high" on gate 9 and a "low" on gate 10. NOR gate 11 detects either output of the sensors such that when both beams have been interrupted and then passed, the output of gate 11 will go "high" and trigger one-shot 12 producing a short duration "high" pulse which, in conjunction with gates 13 and 14 will produce a short duration "low" pulse at the output of whichever gate is steered on by the flip-flop.

If a person starts to go through the doorway but reverses his motion and returns to the same side of the doorway, additional circuits comprising set-reset flip-flops and steering gates are required to insure that the system is not fooled. A flip-flop comprised of NAND gates 17 and 18 is steered by NAND gate 15 will "set" causing the output of gate 17 to go "high" enabling the "down" gate 13 and causing the output of gate 18 to go "low" inhibiting gate 16 to lock out the other flip-flop (gates 19 and 20). If the person now reverses direction in the doorway, the flip-flop comprised of gates 9 and 10 will steer gate 14 "on" and gate 13 "off" but since the reverse is true for the other two flip-flops, no "up" or "down" pulse will occur at the outputs of gates 13 or 14. At the end of each action, whether a true passage thru the doorway, or a reversal of direction, one-shot 12 still triggers, and in turn triggers one-shot 21 resetting flip-flops 17–18 and 19–20 to ready them for use again. Obviously, the identical results take place from the other direction, only flip-flop 19–20 with gate 16 locks out flip-flop 17–18 permitting only "up" counts.

In the example in question, since gate 9 is "high" and gate 10 is "low" an output pulse will appear on gate 14 output causing the bidirectional counter to add one person to the total count.

Obviously, the same procedure applies to a person moving in the opposite direction except that gate 13 output will produce an output pulse unless a "low"

level from the inhibit gate of the bidirectional counter is present indicating a count of 0 persons in the room. The "one count" switch allows reprogramming the count to correspond with room occupancy should a power outage or error occur.

The inhibit gate is an 8—input OR gate detecting each of the outputs of the two 4-bit binary counters. Its output will remain "high" when a count of 1 to 255 remains in the counter stages, causing the relay to remain energized and controlling the temperature or lights.

The time delay circuit is provided to turn-off of the lights or modification of temperature to allow for normal interchange of persons back and forth between rooms to eliminate unnecessary cycling of temperature or lights.

The manual reset switch clears the bidirectional counter in the event of an error in counting, thus preventing an unoccupied room from continuing with lights or unnecessary temperature levels, and allows reprogramming the count to correspond with room occupancy.

An indicator lamp may be provided to locally indicate proper system operation.

The counter may also indicate actual numbers so the exact number of persons or objects in the room or space can be determined by visual observation.

It will be apparent that various changes can be made within the spirit of the invention as defined by the valid scope of the claims.

What is claimed is:

1. A monitoring and control system operable upon the ingress and egress of persons or objects through an entrance to and from a separate space such as a room comprising a first detector means disposed at said entrance to said space and a second detector means spaced from the first detector means and disposed at said entrance to said space, each detector means operating for indicating the direction of ingress of persons or objects to or egress of persons or objects from said space and providing a count thereof, a bidirectional count means to record the number of persons or objects entering and exiting said space, electronic means to actuate said bidirectional count means from each said detector means, and load means to control the ON-OFF condition of an energy system operatively associated with said space in response to the count of said bidirectional count means.

2. The invention according to claim 1 in which means are provided to prevent actuation of said bidirectional count means if a person or object commences to pass through the entrance and but returns to an original starting position without having passed completely through the entrance.

3. The invention according to claim 1 in which each said detector means includes a set of light emitting means and light sensing means indicating the presence of a person or object between the light emitting means and its cooperating light sensing means.

4. The invention according to claim 1 in which means are provided to require a sequential order by which the detector means that is activated must complete its cycle while an opposing detector means is activated, and then the said opposing detector must complete its cycle to thus indicate forward movement and cause a count and direction to be recorded.

5. The invention according to claim 1 in which direction of ingress to or egress from said space is determined from the said designated positions of said detector means.

6. The invention according to claim 1 in which said energy system includes the illumination and heat-cooling means for said space, said load means being turned-ON when there are persons within said space and being turned OFF when there are absence of persons within said space for achieving a more economical use of an unoccupied condition of said space.

7. The invention according to claim 1 in which means are actuated upon the contents of the bidirectional count means advancing to a predetermined control number to indicate the level of occupancy, and a maximum predetermined control number to indicate the said space to be over occupied.

8. The invention according to claim 7 in which said space is illuminated and temperature controlled and said load means is actuated upon the contents of the bidirectional count means advancing to a count greater than the said predetermined control number for changing the energy system controlling lighting or temperature to a more desirable level indicating an occupied condition.

9. The invention according to claim 1 in which said energy system includes illumination means, illumination extinguishing means, and temperature changing means, and in which time delay means is provided to delay the actuation of the illumination light extinguishing means and the temperature changing means of said energy system to prevent immediate illumination and temperature changes from occuring until a preselected period has passed after the bidirectional count means indicates zero occupancy of the space.

10. The invention according to claim 1 in which manual count change means is provided for correcting the bidirectional count means for unexpected changes in the occupancy of the space or for failure of power.

11. The invention according to claim 1 in which a reset means is provided to return the bidirectional count means to zero.

12. The invention according to claim 3 in which the light emitting means are diodes and light sensing means are transistors which saturate when exposed to light clamping their collectors "low", NAND gate for each transistor and an inverter for each transistor connected to the output thereof, NAND gates connected to said transistors and connected to flip-flops, said flip-flops being connected to steering NAND gates for down count and up count, a steering flip-flop for the down count and the up count, a NOR gate connected to said transistors and connected to a monostable multivibrator, said monostable multivibrator connected to another monostable multivibrator for producing the signal to be steered by said steering NAND gates, an OR gate connected between said bidirectional counting means and a time delay circuit, said time delay circuit being connected to a relay for operating the illumination control and for operating the temperature control whereby a number of persons or objects entering and leaving the said space are accurately counted and the illumination and temperature modification are changed to a more economical condition when the space is unoccupied or is occupied at a predetermined control lever.

* * * * *